United States Patent [19]
Pichler

[11] Patent Number: 4,839,472
[45] Date of Patent: Jun. 13, 1989

[54] CLOSURE SYSTEM FOR A LONGITUDINALLY DIVIDED CABLE SLEEVE

[75] Inventor: Klaus Pichler, Otterfing, Fed. Rep. of Germany

[73] Assignee: Siemens Aktiengesellschaft, Berlin and Munich, Fed. Rep. of Germany

[21] Appl. No.: 194,957

[22] Filed: May 17, 1988

[30] Foreign Application Priority Data

May 27, 1987 [DE] Fed. Rep. of Germany ....... 3717980

[51] Int. Cl.[4] .......................................... H02G 15/113
[52] U.S. Cl. .......................................... 174/92; 24/25; 174/93; 403/313
[58] Field of Search ................... 174/92, 93; 403/313; 24/25

[56] References Cited

U.S. PATENT DOCUMENTS

719,817  2/1903  Kunze ..................................... 24/25

FOREIGN PATENT DOCUMENTS

2158992  5/1973  Fed. Rep. of Germany ........ 174/92

*Primary Examiner*—Morris H. Nimmo
*Attorney, Agent, or Firm*—Hill, Van Santen, Steadman & Simpson

[57] ABSTRACT

A closure system for a longitudinally divided cable sleeve, which has longitudinal closure beads expanding wedge-shaped and matched clamping rails. The closure elements have an arrangement to aid in drawing the clamp rails onto the beads, which includes supporting elements fixed relative to the beads and abutment openings in one of the rails which are engaged by a leverage tool which is inserted therethrough to urge the rail into and out of engagement of the beads. The clamp rail can be drawn onto the wedge-shaped beads in a step-by-step leverage motion using a tool.

20 Claims, 3 Drawing Sheets

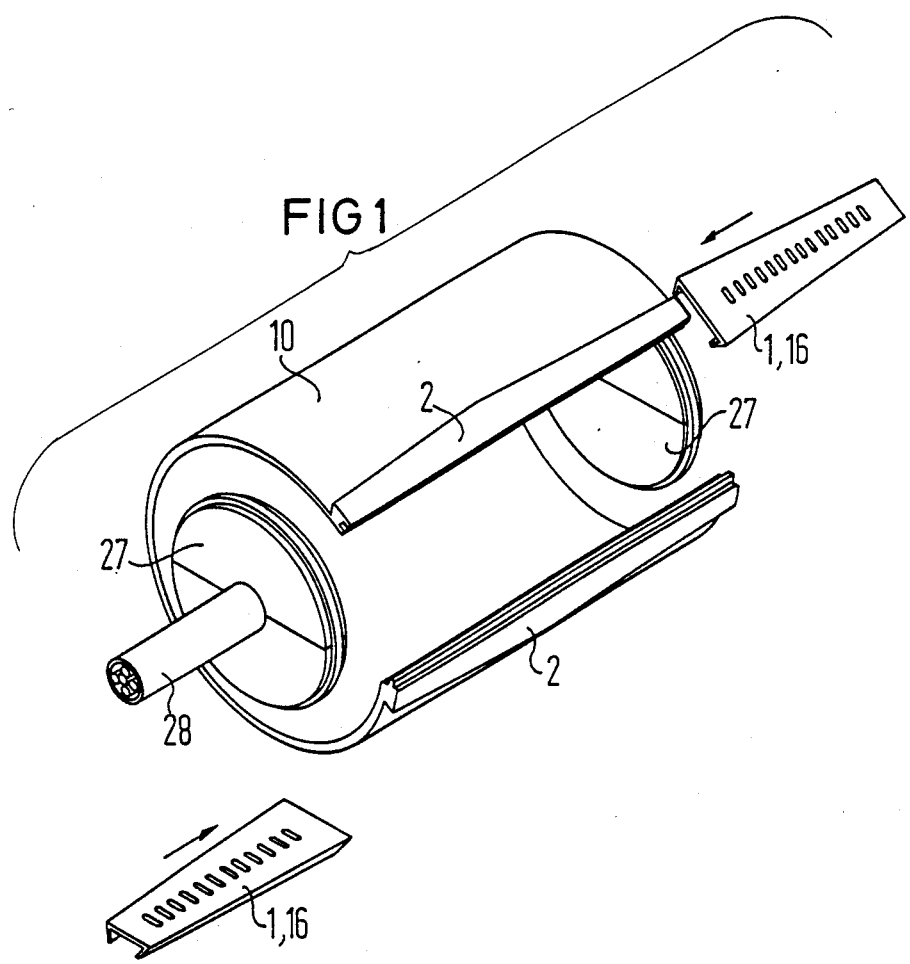

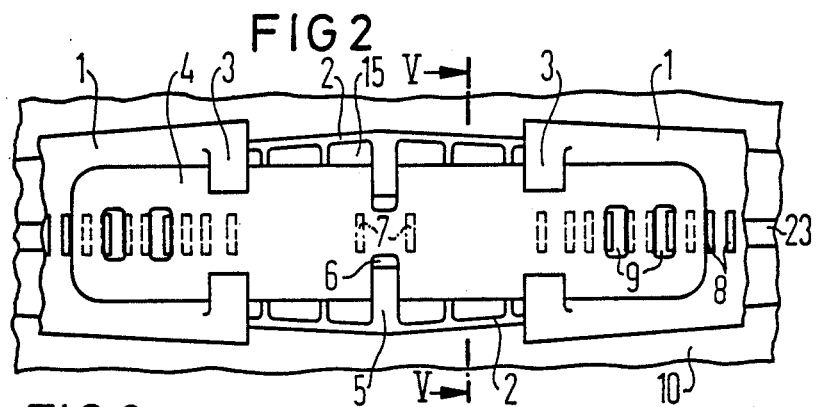
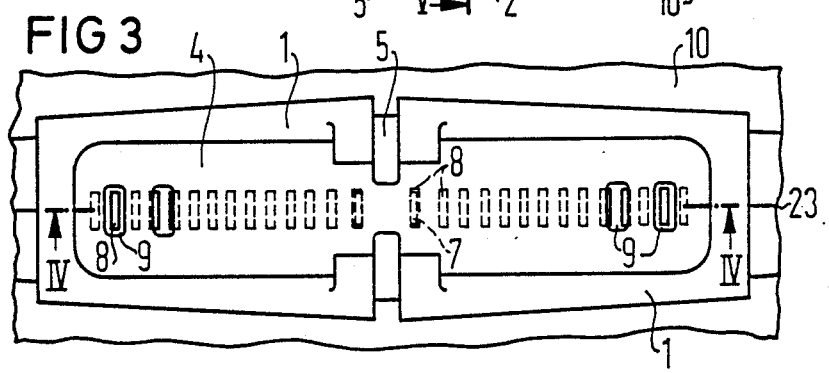
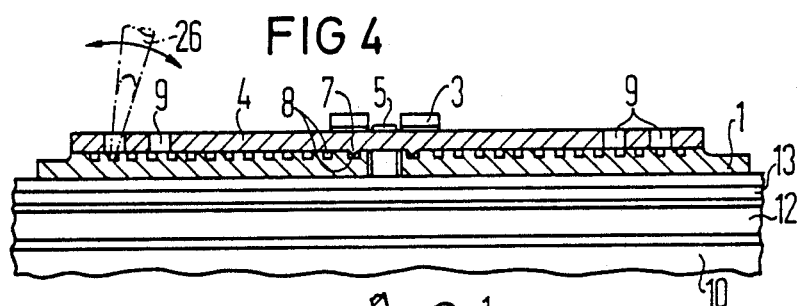
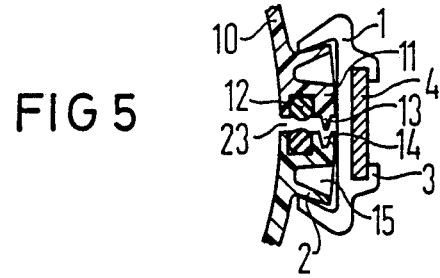

CLOSURE SYSTEM FOR A LONGITUDINALLY DIVIDED CABLE SLEEVE

BACKGROUND OF THE INVENTION

The present invention is directed to a closure system for a longitudinally divided cable sleeve of plastic. The closure system comprises two beads which are undercut and are expanded wedge-like along a parting line, such as with the expansion being from each end of the bead towards the center and at least one wedge-shaped clamping rail for engaging the beads and drawing the beads together. The system also includes a draw-on aid which includes an arrangement which is engaged by a lever to help cause a movement of the rail relative to the beads to the final clamping position.

U.S. Pat. No. 4,087,190, whose disclosure is incorporated by reference thereto and which claims priority from German Utility Model 76 20 440, discloses a clamp rail that is drawn onto a wedge-shaped bead with special tools and which can be opened by special tools. The fixing in the final condition or position and the securing against sliding off occurs with the assistance of a tension band that is introduced through projecting loop portions on each of the clamping rails and then is mutually placed in tension. A suitable clamping tool is needed for gripping and operating these straps.

U.S. Pat. No. 4,715,740, whose disclosure is incorporated by reference and which claims priority from German Applicaiton No. 35 42 153, discloses a closure system for longitudinally divided cable sleeve having beads likewise fashioned wedge-shaped along the parting line and having wedge-shaped clamping rails. These rails have a draw-on aid that is composed of a resilient strip or tongue on one of the clamping rails and a corresponding guide channel on the other of the pair of rails. The two clamp rails can be moved toward one another on the beads of the cable sleeve with an appropriate lever arrangement acting between the abutments provided on the strip and on the second clamp rail so that the longitudinal gap is closed as a consequence of the wedge-shaped design of the two rails. This sealing, however, requires two different embodiments of the clamping rail and the mutual draw-on occurs on the basis of mutual support via a lever or tool. A fixed point of reference for the cable sleeve, however, is, therefore, not established so that the two clamp rails may not be uniformly drawn on during the closing event under certain conditions.

SUMMARY OF THE INVENTION

It is an object of the present invention to create a closure system for a longitudinally divided cable sleeve wherein only a single type of closure element is used and wherein a uniform closing event can be obtained over the entire longitudinal sealing region.

These objects are obtained by an improvement in a closure system for a longitudinally divided cable sleeve for a plastic sleeve member, said closure system having a parting line with beads extending therealong, said beads having a wedge shape extending at least from one end and, preferably, inward from both ends with the maximum width being adjacent the center, at least one and preferably two wedge-shaped clamp rails for engaging the beads, means for assisting and drawing each clamp rail onto the beads into a clamping positioin utilizing a leverage action of a tool. The improvements are that the means for drawing on are formed by a plurality of supporting elements positioned along the parting line of the cable sleeve and either permanently formed in the portion of the bead or fixed as a separate member in a position relative to the beads and abutment openings arranged in each of the clamp elements corresponding to the support elements, said support elements and abutment openings having sufficient offset in spacing so that they are matched with each other and at least one opening is positioned relative to at least one support element to enable introduction of the leverage tool for displacing the clamp rail in a long itudinal direction for each position of the rail on the beads.

Other important features are providing fixing means for securing or holding the clamp rail in a final fixed porition and to provide means to prevent longitudinal shifting of the beads relative to each other as the clamping rail is being assembled thereon. The advantages over the previous prior art is that since the support elements are either arranged in the cable sleeve itself or are mounted on the cable sleeve as an auxiliary element, a single type of closure element in the form of a wedge-shaped clamping rail can be utilized. It is, thus, possible to draw every clamping rail independent of the other clamping rail. For example, a closure system comprising only a single clamping rail could also be crated and utilized the draw-on means of the present invention.

In an execution of the invention with two oppositely directed clamp rails, each can be independently drawn-on in a mutual alternate manner so that a continuous closing event can be realized over the full length by alternating tightening of the individual clamp rails. The support elements of the draw-on means are thus arranged in position with a fixed reference on the cable sleeve along the parting line, whereas the abutments required for leverage are, respectively, provided as openings in each of the clamp rails. By providing means to prevent longitudinal shifting of the beads during assembly enables preventing any possible misalignment between the beads and disturbing the seal.

Other advantages and features will be readily apparent from the following description of the preferred embodiments, the drawings and claims.

BRIEF DESCRIPTION OF THE DRAWINGS

FIG. is a perspective view of a cable sleeve with a closure systme in accordance with the present invention in a partially disassembled state;

FIG. 2 is a plan view of one embodiment of the closure system in a partially closed state;

FIG. 3 is a plan view of the closure system of FIG. 2 in a closed state;

FIG. 4 is a cross sectional view taken along the lines IV—IV of FIG. 3;

FIG. 5 is a cross sectional view taken along the lines V—V of FIG. 2;

DESCRIPTION OF THE PREFERRED EMBODIMENTS

Figure 6:
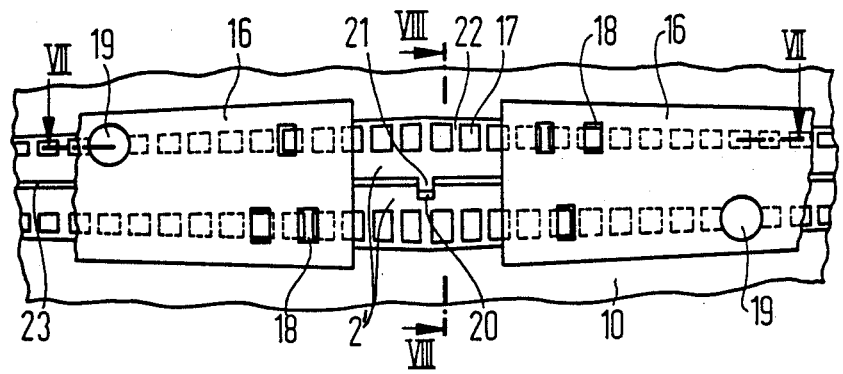
FIG. 6 is a plan view of a second embodiment of the closure system in accordance with the present invention.

The principles of the present invention are particularly useful when incorporated into a closure system for cable sleeve, illustrated FIG. 1. The cable sleeve of FIG. 1 has a singly slotted sleeve member 10 that is equipped with a closure system of the present invention along a parting line, which is provided with two wedge-shaped beads 2 that respectively expand from each end toward the center of the sleeve and receive clamp rails, such as 1 or 16, which have a correspondingly matched wedge-shaped condition. In the cable sleeve of FIG. 1, the sleeve member 10 is pressed onto two end sealing members 27, whose peripheral edges receive sealing elements to form a seal therewith, and these end members 27 will have cable introduction openings formed therein for cables, such as 28. In FIG. 1, the two arrows associated with each of the clamp rails 1 or 16 indicates the direction of pushing on of the rail to form the closure system. A further understanding of the closure system will be readily apparent from the following description of the drawings. It should be noted that while the cable sleeve of FIG. 1 has a single sleeve member 10, the closure system could, likewise, be used for those cable sleeve systems that have multiply divided sleeves, for example a system composed of half-shells having two parting lines and a closure system for each line.

A first embodiment of the closure sleeve is illustrated in FIGS. 2–5 and utilizes an additional reference plate 4 for a portion of the means for drawing the clamp elements or rails 1 onto the two beads 2 of the sleeve 10. As illustrated, the beads 2 are adjacent a longitudinally extending slot 23 of the sleeve member 10. The reference plate 4 serves the purpose of obtaining a support which, with respect to the position, is fixed on the cable sleeve. To this end, the reference plate 4 extends over the middle of the sleeve 10 into the region for each of the clamp rails that have just been put into place and are still loosely received. The reference plate 4 is held in this position in the middle of the sleeve 10 by a cog or projection 5 on each of the beads 2, which cog or projection 5 is received in a corresponding cut-out or recess 6 or the plate 4. Adjacent each end of the plate 4 are supporting elements 9 which are formed of cut-outs that are positioned so that they respectively come to lie over the abutment openings or recesses 8 that are arranged in rows in the clamp rails 1. The size and position of the apertures or openings forming the elements 9 are arranged so that, with reference to the spacing of the abutment openings 8, at least rail identical to the first mentioned rail partially appears in the cut-out or aperture of the supporting element 9 of the reference plate 4 for every longitudinal position of the rail 1.

A suitable, simple leverage tool, for example an ordinary screwdriver 26 (FIG. 4) can, thus, be pushed through the aperture 9 and into engagement in the recess or opening 8 in the clamp rail 1 and with piviting movement of the tool, which provides a leverage motion, cause the rail 1 to move relative to the plate 4. Depending on the direction of the leverage motion, the clamp rail 1 can, thereby, be either drawn on or drawn off of the beads 2. Preferably, one and then the other clamp rails 1 are moved in alternative manner to provide a uniform draw-on to be achieved without difficulty. The seal is uniformly pressed over the entire length during this closure event in this way.

When the final position for each of the rails 1 is obtained, as illustrated in FIG. 3, the parting slot 23 is closed and the required closing pressure in the longitudinal sealing region, as well as in the annular region relative to the sealing members at the end face, is built up by the clamp rails 1 seated in their final position. The final position of the clamp rail 1 is relatively fixed by a corresponding latch element 7 (best illustrated in FIG. 4), for example, a resilient projection or cog that is arranged on a surface of the reference plate 4 facing the clamp rails or elements 1. This resilient cog engages into one of the abutment openings or recesses of the clamped rail 1. It may also be seen that the projections 5 of the beads 2 that serve, first, as reference interlocks or points for the refernece plate 4, also serve as means for preventing longitudinal shifting of the sealing system. These cogs or projections 5 are moved closer together and, thus, inserted deeper into the cutouts or recesses 6 of the plate 4.

The actual movement of the leverage tool, such as a screwdrive 26, is best illustrated in FIG. 4 in broken lines and shows how the leverage tool can be moved to shift the rail 1 relative to the plate 4. As illustrated in FIG. 4, the tip of the tool extends into one of the abutment openings or recesses 8 in the rail and is ureged against a side of the opening 9 of the plate. Also illustrated in FIG. 4 is a longitudinal sealing system comprising the sealing insert 12 and a longitudinal centering nose or lip 13, which are provided in the edge of one of the beads 2.

As illustrated in FIG. 5, each of the beads has a sealing member 12 received in a groove, and one of the beads has a guide groove or guide channel 14 for coacting with the centering nose or centering ridge 13, as the longitudinal slot 23 is closed by the beads being pressed together with the seals in engagement with each other. As noted, the centering nose 13 and the guide channel 14 coact to align the longitudinal sealing system relative to one another. The profile of the rail 1 is also illustrated in FIG. 5 and shows its relationship to the two beads 2. As illustrated in FIGS. 2–5, each of the rails 1 is provided with two guide elements 3 for guiding the plate 4. The guides of the rails hold the reference plate 4 in the corresponding parallel position relative to the rails. It is also noted that in the embodiment of FIGS. 1, 2 and 3, each of the beads has upwardly extending openings or depressions 15, although they are not utilized because the rails 1 act as part of means to aid on drawing on the rails onto the beads.

In the exemplary embodiment of FIGS. 2–4, the support elements 9 and the abutment openings 8 are centrally arranged in line above one another and matched to one another in a single row, since the clamping rails 1, as well as the reference plate 4, span the parting slot 3. The referenc eplate is lacking in the second embodiment illustrated in FIGS. 6–8 so that only one element, namely the clamping rail spans the parting slot 23. The two rows of closure elements are needed here for this reason, and it shall be set forth in greater detail hereinbelow.

As illustrated in FIG. 6, the supporting elements 17 are formed directly in an upper surface of each of the beads 2' of the sleeve 10 in the form of depression, similar to the depressions 15 of FIG. 5. Instead of being formed as depressions, they can also be formed as a result of transversely extending projections that are spaced in the longitudinal direction, such as the projections 22 of FIG. 7. In order to achieve a good movement of the clamping rails 16 on the beads 2', the supporting elements 17 in both beads 2 are arranged lying following one another along the longitudinal edges. Accordingly, the clamping rail 16 has two rows of abutment openings 18, which correspond to these bead rows. As in the first exemplary embodiment, the supporting element 17 and the abutment openings 18, which are associated therewith, are matched to one another in terms of spacing and in terms of size so that the clamping rail 16 can be moved in a longitudinal direction on the beads by a leverage action with the assistance of an inserted leverage tool. The clamp rails can, therefore, be pulled on or pulled off, dependent on the leverage direction. A fixing of the sealing system in the longitudinal direction again occurs on the basis of a center cog or projection 21 provided in one of the beads 2', which is received in a recess or incision 20 arranged opposite thereto in the other of the beads 2'. It is additionally advantageous, here, that a minimum of individual parts is required and that the manipulation is especially simple when pulling the clamping rails 16 on or, respectively, off. As a consequence of the arrrangement of the draw-on elements in two rows, moreover, a very small offset diemension between the supporting element 17 and the abutment openings 18 can also be achieved so that the clamp rail 16 can be even more uniformly pulled on or, respectively, pulled off in this way. The mutual matching of the distance between the support element 17 and the abutment openings 18 in one row, and relative to the second row, is thereby selected so that the beneficial leverage spacing is established in every position for the clamp rail. In order to fix the clamp rail 16 in its final position, a stopper, such as 19, for example in the form of drive-in pin is carried in an opening 19a and is pressed into the supporting elements 17 (FIG. 7) so that an independent dislocation of the clamp rail 16 is no longer possible.

Figure 7:
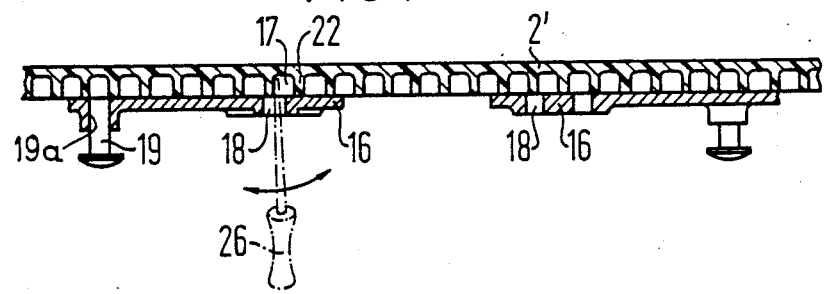
FIG. 7 is a cross sectional view taken along the lines VII—VII of FIG. 6.

As best illustrated in FIG. 7, the leverage action of the tool 26 is introduced through one of the abutment openings 18 and the clamp rail 16 and into the supporting element 17. As mentioned above, the supporting element 17 can be fashioned either as a depression or incision or it can also be formed due to transversely disposed ridges or profiles 22. The region of the abutment opening 18, for example, can be fashioned or formed in a reinforced manner with an increased thickness so that a greater leverage spacing can be achieved as a result thereof. Each of the fixing or stop elements can also have their openings 19a provided in a reinforced or greater thickness area to provide additional strength.

Figure 8:
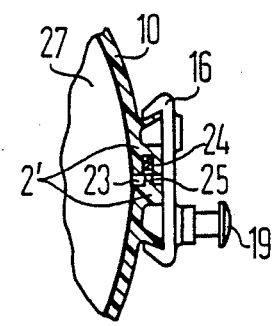
FIG. 8 is a cross sectional view taken along the lines VIII—VIII of FIG. 6.

As illustrated in FIG. 8, as the gap or slot 23 proceeds towards the closed position, one of the longitudinal edges of the beads 2' has a guide channel or guide groove receiving a sealing insert 24, which is engaged by a projection or centering ridge 25 on the other of the beads 2'. The clamping rail 16 has not yet been completely drawn on and the fixing device in the form of the stopper or pin 19 is not pressed into the supporting element 17. It also becomes clear that the cable sleeve element 10 may be pulled onto the sealing member 27 on each of the end members as the longitudinal gap 23 is sealingly closed.

The clamp or clamping rails 1 or, respectively, 16 can be composed of corrosion-resistant metal or can also be composed of suitable plastic materials, for example of polyester. When using the plastic materials, reingorcing inserts, such as glass fibers, can also be provided. The stiffening profiles, as known from the prior art, can also be formed in order to increase the strength or can be integrated into the plastic member.

Although various minor modificaitons may be suggested by those versed in the art, it should be understood that I wish to embody within the scope of the patent granted hereon all such modificaitons as reasonably and properly come within the scope of my contribution to the art.

I claim:

1. In a closure system for a longitudinally divided cable sleeve of a plastic material having two undercut beads expanded wedge-shaped along a parting line of the sleeve, said closure system being composed of two undercut beads and a wedge-shaped clamp rail engaging behind said beads and having draw-on means for aiding in a forcing of the clamp rail onto and off of the beads, the improvements comprising means for preventing longitudinal shifting of the beads relative to each other and the draw-on means being formed by a separate plate having supporting elements being spaced therein along a direction of the parting line of the cable sleeve in a relatively fixed position and abutment openings being arranged in the clamp rail corresponding to the supporting elements, said means for preventing longitudinal shifting of the beads including said plate having a pair of spaced recesses for receiving projections provided on the two beads to fix the plate in a fixed position relative to the beads and the clamp rail having guides for engaging the plate as the clamp rail move toward a closed position, said supporting elements and abutment openings being offset relative to one another in the longitudinal direction of the cable sleeve and being matched so that for every longitudinal position of the clamp rail on siad beads, at least one abutment opening is accessible through at least one supporting element to be engaged by a leverage tool intorduced through the one supporting element to displace the clamp rail along said beads.

2. In a closure system according to claim 1, which has a second clamp 1.

3. In a closure system according to clalim 2, wherein the clamp rails are composed of corrosion-resistant metal.

4. In a closure system according to claim 2, wherein the clamp rails are composed of a plastic material.

5. In a closure system according to claim 4, wherein said plastic material is a polyester.

6. In a closure system according to claim 4, wherein the plastic material includes reinforcing inserts formed of fiberglass.

7. In a closure system according to claim 2, wherein each of the clamp rails has a stiffening profile.

8. In a closure system according to claim 1, wherein supporting elements are arranged in a single row on the plate.

9. In a closure system according to claim 1, which includes fixing means for holding the clamp rail in the final position, said fixing means including a projection on the plate engaged in one of said abutment openings in the clamp rail.

10. In a closure system according to claim 1, wherein the closure system includes a double seal introduced in the gap between said beads.

11. In a closure system according to claim 1, which includes a centering ridge arranged along one of the beads extending into the parting line and received in a guide groove in the other bead.

12. In a closure system for a longitudinally divided cable sleeve of a plastic material having two undercut beads expanded wedge-shaped along a parting line of the sleeve, said closure system being composed of two undercut beads and two wedge-shaped clamp rails engaging behind said beads and having draw-on means for aiding in a forcing of the clamp rails onto and off of the beads, the improvements comprising means for preventing longitudianl shifting of the beads relative to each other and the draw-on means being formed by supporting elements being arranged on the beads and being spaced along the parting line of the cable sleeve in a relatively fixed position and abutment openings being arranged in each of the clamp rails corresponding to the supporting elements, said supporting elements and abutment openings being offset relative to one another in the longitudinal direciton of the cable sleeve and being matched so that for every respective longitudinal position of each rail on said beads, at least one supporting element will be accessible through at least one abutment opening to be engaged by a leverage tool introduced through the one abutment opening to displace each clamp rail along the beads.

13. In a closure system according to claim 12, which includes a centering ridge arranged along one of the beads extending into the parting line and received in a guide groove in the other bead.

14. In a closure system according to claim 12, wherein the support elements are arranged in two separate rows, one on each of the beads, and each of the rails has abutment openings aligned with each row of support elements.

15. In a closure system according to claim 12, which includes fixing means for holding the rail in the final position, said fixing means comprising a pin carried on each of the rails in a position for insertion into one of the supporting elements.

16. In a closure system according to claim 12, wherein the means for preventing longitudinal shifting of the beads includes a lateral projection on one of the beads extending into a laterally extending recess in the other of the beads and coacting together to prevent longitudinal displacement of the beads relative to each other.

17. In a closure system according to claim 12, wherein each of the supporting elements is constructed as a depression, particularly an incision.

18. In a closure system according to claim 12, wherein each of the supporting elements is fashioned as projecting profiles.

19. In a closure system according to claim 12, which includes fixing means for holding the rails in a fixed position, said fixing means includes a latching element for each of the clamp rails.

20. In a closure system according to claim 12, wherein the closure system includes a single seal arranged in a channel in one of said beads.

* * * * *